(No Model.)   2 Sheets—Sheet 1.
R. ORTEGA.
HARNESS.
No. 527,344.   Patented Oct. 9, 1894.
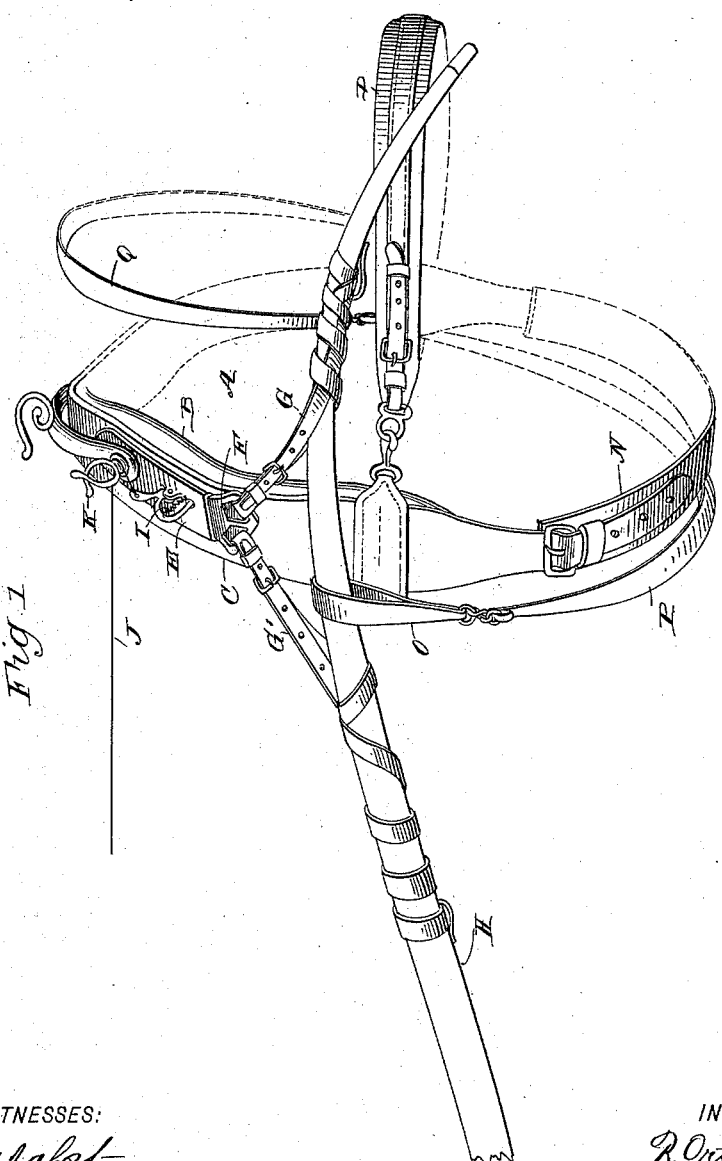
WITNESSES:
INVENTOR
R. Ortega
BY
Munn & Co.
ATTORNEYS.

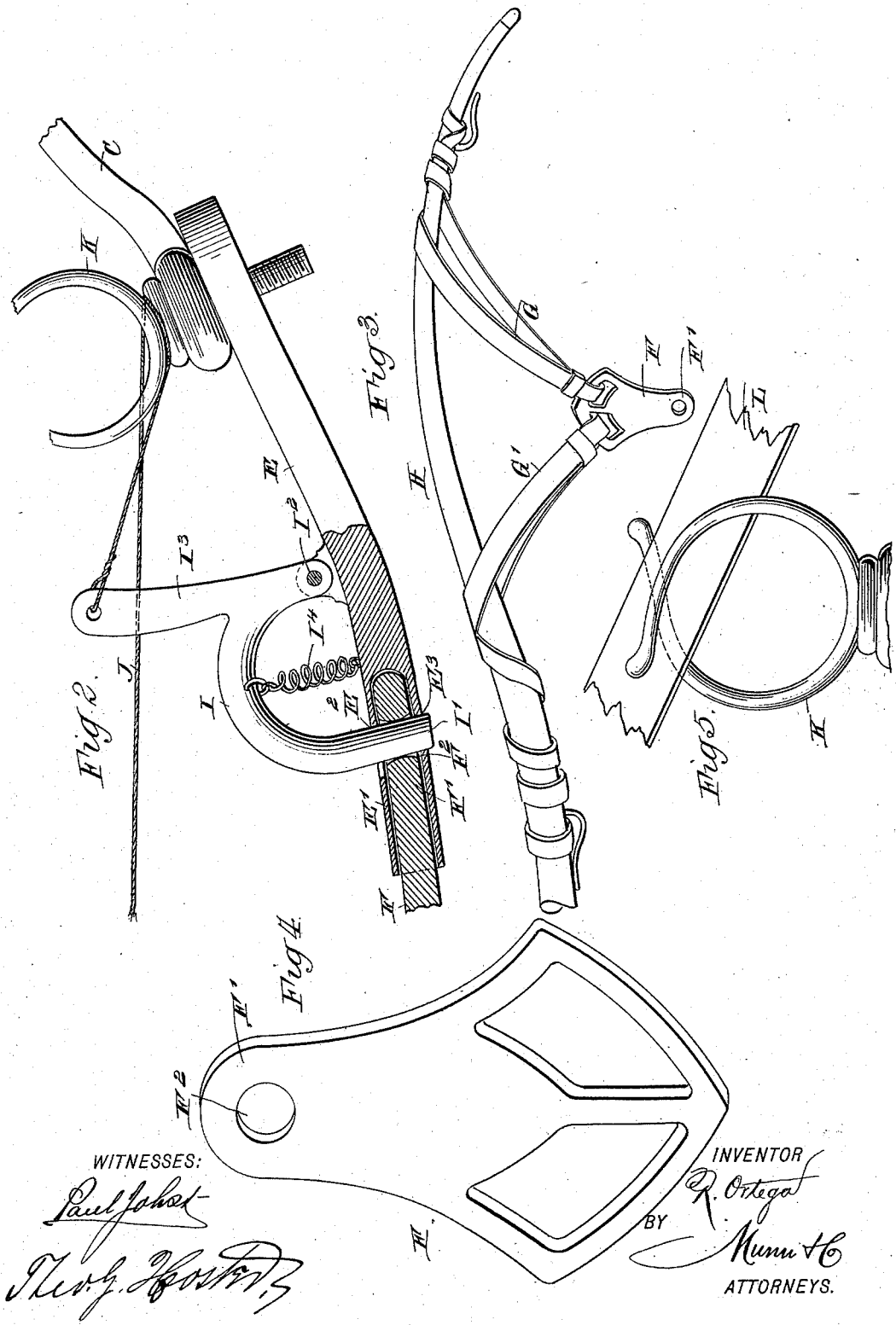

UNITED STATES PATENT OFFICE.

RICARDO ORTEGA, OF CIUDAD PORFIRIO DIAZ, MEXICO.

HARNESS.

SPECIFICATION forming part of Letters Patent No. 527,344, dated October 9, 1894.

Application filed July 3, 1894. Serial No. 516,447. (No model.)

*To all whom it may concern:*

Be it known that I, RICARDO ORTEGA, of Ciudad Porfirio Diaz, Coahuila, Republic of Mexico, have invented new and useful Improvements in Harnesses, of which the following is a full, clear, and exact description.

The object of the invention is to provide certain new and useful improvements in harnesses, whereby an animal can be conveniently and quickly hitched to the shafts of a vehicle, or instantly detached therefrom in case of a runaway.

The invention consists in certain parts and details, and combinations of the same, as will be hereinafter fully described and then pointed out in the claims.

Reference is to be had to the accompanying drawings, forming part of this specification, in which similar letters of reference indicate corresponding parts in all the views.

Figure 1 is a perspective view of the improvement as applied. Fig. 2 is an enlarged transverse section of part of the improvement. Fig. 3 is a perspective view of the plate and straps attached to the shafts. Fig. 4 is an enlarged perspective view of the plate; and Fig. 5 is an enlarged perspective view of the terrets with the reins in position.

The improved harness is provided with a saddle A, having a pad B and jockey plate C, connected by snap hooks or other suitable means with the usual pull strap or trace band D. On the jockey plate C on opposite sides of the saddle is secured a separate bar E, formed in its lower end with a recess E' adapted to receive the apertured end F' of a plate F, formed with loops engaged by straps G and G', extending obliquely and fastened to the shafts H, toward the front and rear ends, as plainly illustrated in Figs. 1 and 3.

The plate F is adapted to be locked in place on the bar E by means of the end I' of a bolt I, adapted to pass through apertures $E^2$ and $E^3$ in the said bar E, and through an aperture $F^2$ in the plate F. See Fig. 2. The bolt I, is approximately U-shaped, and is pivoted at $I^2$ to the bar E, and the pivoted end of the bolt is provided with an upwardly-extending arm $I^3$, connected with one end of a rope, cord or rein J, passed around the base of the terret K securing the bar E to the jockey plate C, the said terret K also fastening the yoke carrying the check hook in place.

The cord or rope J extends from the terret K to the driver's seat, so as to be under the control of the driver, to permit the latter to pull on the said cord or rope to impart a swinging motion to the bolt I, so as to withdraw the end I' from the registering apertures $E^3$, $F^2$, $E^2$, to release the plate F from the bar E. A spring $I^4$ is connected with the bolt I and with the bar E, so as to hold the said bolt normally in the position shown in Fig. 2, that is, in engagement with the registering apertures previously mentioned.

Now, when it is desired to unhitch an animal, the operator draws on the arm $I^3$, so as to disconnect the plate F from the bar E, thus releasing the animal from the shafts H. In a like manner when an animal is to be hitched to a vehicle, it is first passed between the shafts, and then the plates F are inserted in the bar E and locked therein by the bolts I. In case of accident, the bolts are released from the driver's seat by pulling the cord J, as previously explained.

The saddle A is provided with the usual belly-band N, and on the shafts H are held the loops O connected by snap hooks or other suitable devices with the band P, also passing under the belly of the horse and preventing the rising of the shafts. A neck strap Q connected by snap hooks with the pull-strap D, is also provided. The terrets K are formed as illustrated in Figs. 1 and 5, that is, have open ends crossing each other, to permit of conveniently inserting the reins L into the terret or removing them therefrom.

It will be seen that when an animal is hitched to a vehicle and it is desired to unhitch the animal, it may be done by unfastening the spring hooks connecting the bands Q and P, and the belly-band N, so that the saddle A, the reins attached to the shafts H, and the latter with the saddle can be suspended by a rope or other means from the vehicle, the said rope extending to the saddle, to support the same in the proper position.

Having thus described my invention, I claim as new and desire to secure by Letters Patent—

1. The combination with the saddle bar or plate having a longitudinally extending socket in its lower end intersected by a transverse aperture, and a bolt pivoted on said bar or plate with its nose projecting through the said aperture into the socket, of a plate adapted at its upper end to enter the socket and there provided with an aperture to receive the bolt and the lower end of the plate being provided with means for connecting the straps thereto, substantially as described.

2. The combination with the harness saddle provided at opposite sides with bars or plates, each having a longitudinally extending socket in its lower end intersected by a transverse aperture, and a bolt pivoted to each bar or plate with its nose projecting through said aperture into the socket, of a plate adapted at its upper end to enter the socket and there provided with an aperture to receive the nose of the bolt, and the diverging straps secured at their upper ends to the lower end of the said apertured plate and adapted to be wrapped around the shaft, substantially as set forth.

3. The combination with the harness saddle and the bars E at opposite sides thereof, and provided at their upper ends with transverse apertures through which the terret bolts pass to secure said bars to the saddle, the lower ends of the bars being provided with sockets and spring pressed intersecting bolts, of the plates F having apertured upper ends entering the sockets and receiving the bolts and the straps G G' depending from the lower end of plate F, substantially as described.

RICARDO ORTEGA.

Witnesses:
S. M. SIMMONS,
JESSE W. SPARKS.